PROGRAM TAPE READER

Filed Nov. 29, 1957 2 Sheets-Sheet 1

INVENTORS.
DUSAN S. GELLETICH
WILLIAM J. WASYLENKO

BY

AGENT

PROGRAM TAPE READER
Filed Nov. 29, 1957 2 Sheets-Sheet 2
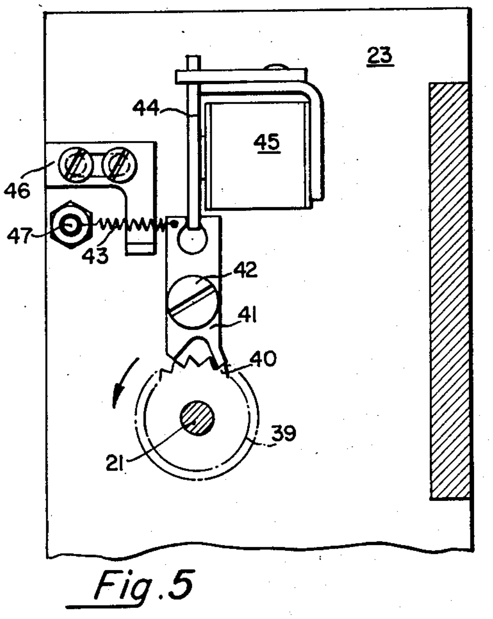
Fig. 5
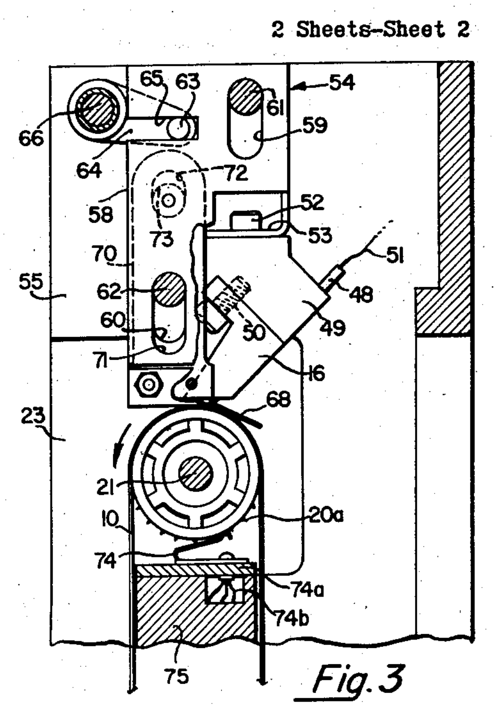
Fig. 3
Fig. 6
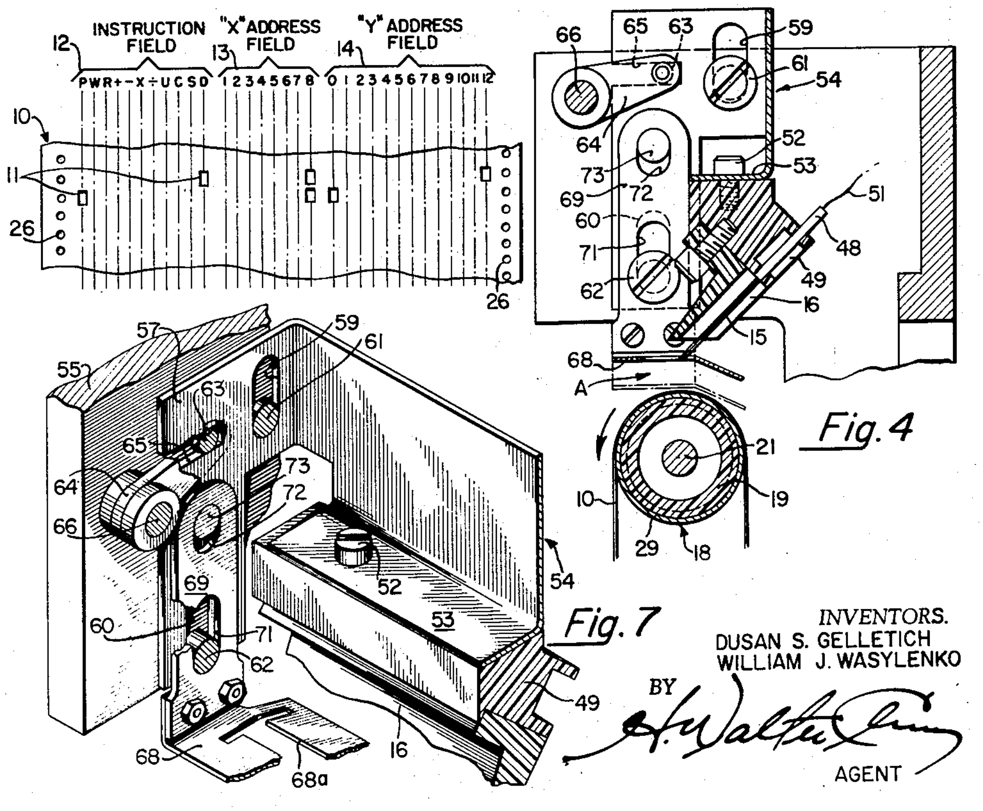
Fig. 4, Fig. 7
INVENTORS.
DUSAN S. GELLETICH
WILLIAM J. WASYLENKO
BY H. Walter ...
AGENT United States Patent Office 2,927,980

Patented Mar. 8, 1960

2,927,980

PROGRAM TAPE READER

Dusan S. Gelletich and William J. Wasylenko, Philadelphia, Pa., assignors to Burroughs Corporation, Detroit, Mich., a corporation of Michigan Application November 29, 1957, Serial No. 699,595

8 Claims. (Cl. 200—46)

The present invention relates to apparatus for sensing and reproducing signals which have been recorded on a perforated record medium, and relates more particularly to a tape reading mechanism for programming a sequence of operations, such for example as employed with electronic computers.

An object of the present invention is to provide an improved high speed tape reading device.

Another object of the invention is to provide tape reading apparatus providing novel scanning of a perforated tape in a manner giving new and extremely reliable results.

Still another object is to provide a tape reader wherein there is substantially no limit to the number of program steps.

A further object is to provide a tape reader wherein the time between programmed steps is materially reduced.

It is another object to provide a tape reader wherein program tapes are easily and rapidly replaced.

A still further object is to provide a tape and tape reader combination for low cost programming with ease and economy.

Generally considered the above objects are obtained by novel apparatus employing a relatively wide perforated tape having a predetermined array of perforations and arranged to be fed step-by-step between an electrically conductive platen and a bank of electrically conductive brushes movably disposed to register with selected perforations in said tape, said step-by-step travel of the tape being controlled by an intermittently operable clutch in a manner to make possible high speed and accurate sensing.

In the accompanying drawings:

Fig. 3 is a sectional view taken on line 3—3 of Fig. 2, showing the bank of brushes in their advanced operative position and a portion of the control assembly for moving them;

Fig. 4 is a sectional view taken on line 4—4 of Fig. 2 showing the bank of brushes in retracted inoperative position for tape replacement, and another portion of the control assembly at the opposite end of the unit from that shown in Fig. 3;

Fig. 5 is a fragmentary sectional view taken on line 5—5 of Fig. 2;

Fig. 6 is a fragmentary view of the perforated tape; and

Fig. 7 is a fragmentary perspective view of a portion of the brush control means.

Figure 1:
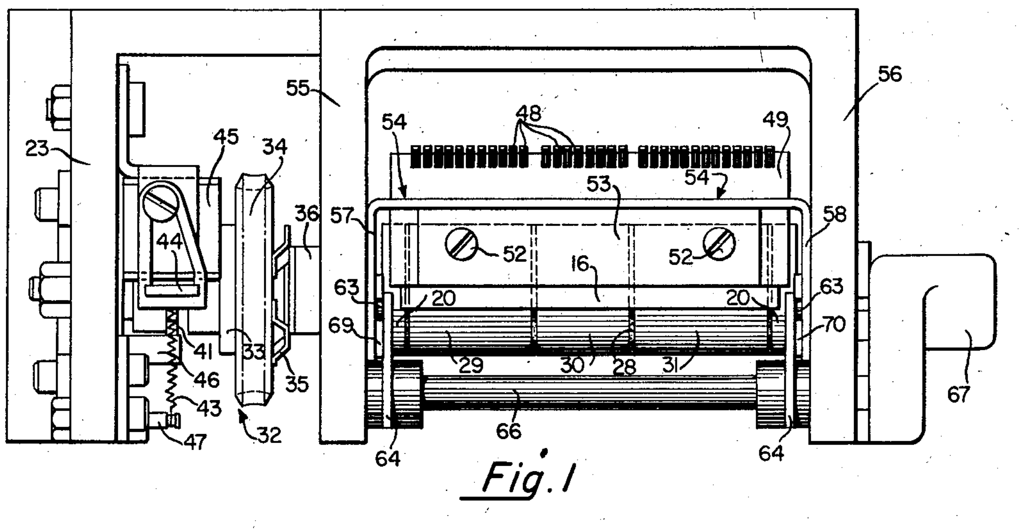
Fig. 1 is a plan view of a tape unit embodying a preferred form of the present invention.

Referring to the drawings, and particularly to Fig. 6 thereof, a program tape 10, preferably of paper lamination, has perforations 11 arranged in linear parallel rows transversely of the tape, each row of which may have a predetermined arrangement of the perforations for programming a computer or other device. The perforations 11 are initially punched for the desired program result, and the rows in the present instance are spaced approximately one-tenth of an inch to be fed intermittently step-by-step for successive scanning of perforation rows. Lengthwise of the tape 10 the perforations of any row are respectively in alignment with perforations in other rows thus to form a plurality of parallel lanes intersecting the transverse linear rows at points where perforations are to be used. This schematic latticework forms a lengthwise channel of the proper width for the selected program of perforations. In the present instance the lengthwise lanes have a spacing of the order of .0625″.

While the invention resides broadly in the use and operation of a single channel of latticed perforations, it is preferred to transversely subdivide the tape 10 into three spaced channels. The first of these channels, identified by the numeral 12, has eleven lanes which can be perforated and is designated "Instruction Field"; the second channel 13 has eight lanes and is identified as the "X" Address Field; and the third channel 14 has twelve lanes identified as the "Y" Address Field. As here shown the instruction field lanes represent certain symbol definitions as indicated, meaning illustratively "P" for Print; "W" for Write; "R" for Read, and so on throughout other definitions. The "X" field is numbered "1" to "8" and the "Y" field "0" to "12," to satisfy certain program requirements. It should be understood however, that the number of perforations shown is illustrative only of a specific program requirement and that other quantities may be used, as desired. In this embodiment of the invention a program will include not more than one perforation in each of the three channels 12, 13 and 14. The prepared tape is to be fed step-by-step under a row of circuit terminal brushes 15 extending through a comb block 16 of insulating material and mounted so that the brushes 15 are respectively aligned with the lane perforations in order to control switching circuits when entering a perforation to make contact with the outer conductive surface 18, at ground potential, of a cylindrical platen 19 of insulating material.

For positioning and feeding the tape 10, it is placed over the cylindrical platen 19 in the manner shown in Fig. 4, and fed step-by-step by two spaced sprocket pin wheels 20 pinned, or otherwise keyed to a driven shaft 21 suitably mounted on bearings 22 in walls 23 and 24 of a frame member 25 to which the various parts of the apparatus are mounted. The pins 20*a* of wheels 20 mesh respectively with two rows of apertures 26 at the side portions of the tape 10. The platen 19 is secured to hubs 27 (Fig. 2) on the inner sides of pin wheels 20 and has its peripheral surface provided with the conducting material 18 which, in order to coact with the three fields of the tape 10, is subdivided by insulation spacers 28 thus to provide, in this instance, three isolated circumferential conducting surfaces 29, 30 and 31 respectively, registering with the three tape channels 12, 13 and 14.

For driving shaft 21, a slip clutch 32 is provided having a clutch plate 33 keyed to the shaft 21 in face to face contact with a nylon gear 34 rotatably mounted on shaft 21 but biased to clutching position with plate 33 by a circular three-finger spring leaf 35, which is compressed between gear 34 and a nylon thrust washer 36 bearing against a collar 36*a* fast to the shaft 21. Gear 34, spring 35 and washer 36 rotate together as a unit, pin 34*a* being press fitted into gear 34 and extending through spring 35 and into an aperture in washer 36 for this purpose. When the apparatus is operating, gear 34 is continuously driven by a worm 37 secured to a shaft 38 rotated by any suitable means, not shown. The continuous torque thus applied to shaft 21 is translated into an intermittent drive through the medium of a ratchet wheel 39 (Fig. 5), which is pinned or otherwise made fast to shaft 21, and which, in this instance, has twenty-four ratchet teeth 40 arranged to be controlled by a bifurcated pawl 41 operating as an escapement for alternately holding the ratchet thus to permit the clutch to slip, and releasing the ratchet for stepping the shaft 21 by the engaged clutch.

The pawl 41 is mounted upon a fixed pivot 42 to be rocked in one direction by a tension spring 43 and in the other direction by the movement of a clapper 44 of a pulse operated solenoid 45 suitably mounted on wall 23. An adjustable stop 46 is provided in the path of the pawl 41 to limit the escapement stroke when shifted by the spring 43, which is stretched between the pawl 41 and an adjustable normally fixed stud 47. By the alternate action of the pulsed solenoid 45 and biasing spring 43, the ratchet wheel 39 is alternately held and released. Stepping of the tape is of the order of one increment for each revolution of an associated memory disc, not shown, the latter rotating at high speed, say 3600 r.p.m. or better.

Figure 2:
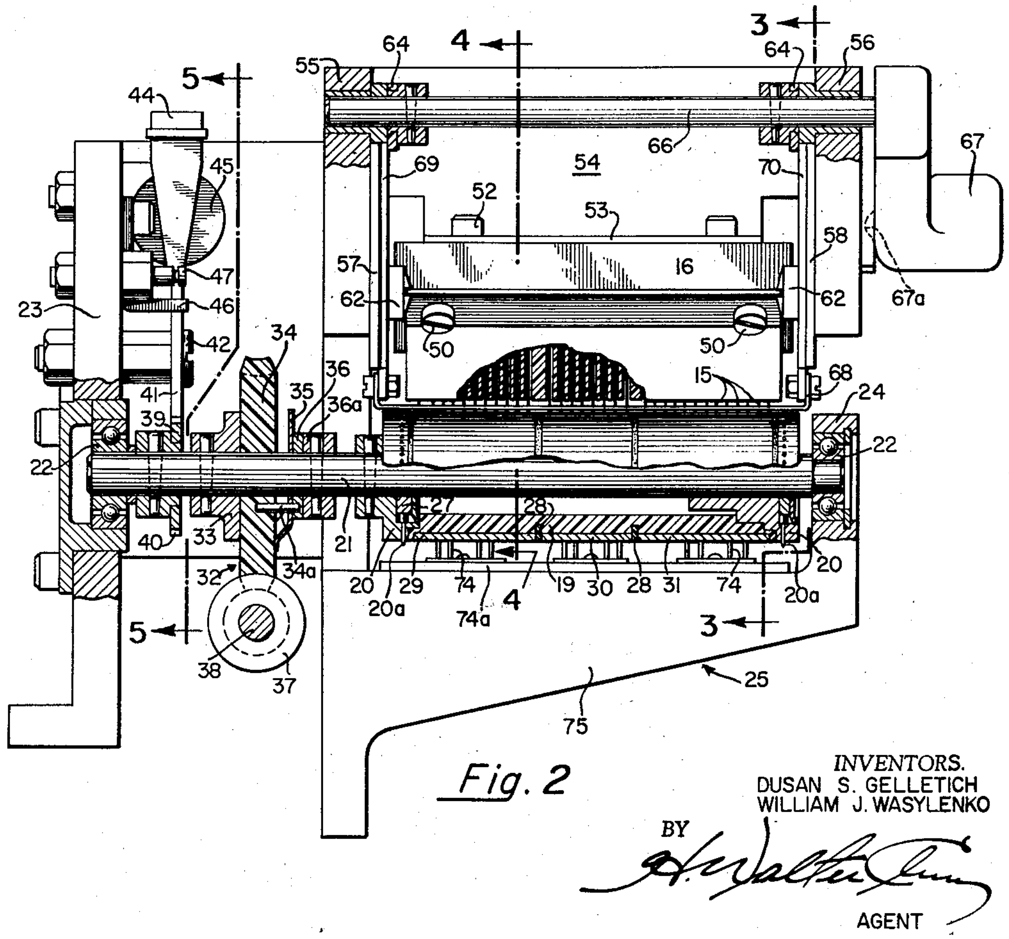
Fig. 2 is an elevation view of the unit with parts broken away.

The brushes are mounted for movement between advanced and retracted operative and inoperative positions respectively. For this purpose block 49 is secured as by screws 52 to a flange 53 of a bracket 54 extending between walls 55 and 56 of frame 25 (Fig. 2). The outer ends of the bracket terminate in flanges 57 and 58 reciprocably mounted on walls 55 and 56. As both are similarly mounted only one will be described. The flange 57, as seen in Fig. 7, has two guide slots 59 and 60 of equal length and proportioned to limit its travel and consequently the movement of block 49 to and from operative and inoperative positions. A stop pin 61 fixed to the frame wall 55 rides in slot 59 and another pin 62 also fixed to wall 55 rides in the slot 60. Reciprocation of flange 57 is under manual control through the medium of a lug 63 projecting laterally from an arm 64 and riding in a slot 65, which is angularly disposed with respect to slots 59 and 60 in order to permit the required linear movement of the flange 57. The arm 64 is keyed to the actuating shaft 66 which extends across the unit (Fig. 2) with its ends journalled in walls 55 and 56. A similar arm 64 is provided on the other end of the shaft simultaneously to reciprocate the flange 58 at that end of bracket 54 when the shaft is operated manually by its attached handle 67.

As a means for protecting the brushes 15 from damage while placing a tape on platen 19, and to maintain the tape on the pin wheels or sprockets 20, a guard 68, in the form of a U-shaped strip having a slot 68*a*, straddles the block 16 and is carried by reciprocable links 69 and 70 secured to opposite ends thereof. Each link has a lengthwise slot 71 in which the pin 62 rides, and also a second lengthwise but shorter slot 72 in which a pin 73 rides. Pin 73 projects laterally from and is fixed to and moves with the plate 57. The slots 71 in links 69 and 70 are shorter than the slots of plates 57 and 58 in order to provide a lost motion between the links and the flanges whereby, when the flanges reach their lowermost position with the brushes wiping the tape, the links are locked against pins 62 and 73, as shown in Fig. 3, to maintain its proper spacing from the platen. Locking may be accomplished in any suitable manner such as, for example, the detent 67*a* on handle 67, as seen in Fig. 2.

In its operation and with the brushes 15 in their retracted or raised inoperative position, as shown in Fig. 4, handle 67 is used to rotate shaft 66 to move the brush assembly downwardly to its advanced operative position, as seen in Fig. 3. During this movement plates 57 and 58 are urged downwardly by movement of pins 63 against the side of slots 65. Links 69 and 70 of guard 68 move with flanges 57 and 58 until the upper ends of slots 71 in the links contact pins 62 which, because slots 71 are shorter than slots 60, is prior to the completion of the downward movement of plates 57 and 58. Continued movement of the latter advances the brushes 15 through the aperture 68*a* in guard 68 and against the tape or platen if an aperture is present. The downward movement is stopped by contact of the upper ends of slots 59 and 60 with pins 61 and 62, and of pins 73 with the lower end of slots 72. With pins 62 against the upper end of slots 71 in links 69 and 70, and pins 73 against the lower end of slots 72, therein, the links are effectively locked against further movement until handle 67 is moved in the opposite direction to retract the brush assembly. During retraction the brush assembly moves as a unit until the lower end of slots 71 contact pins 62 stopping movement of the guard 68 while plates 57 and 58 continue moving until the ends of slots 59 and 60 contact pins 61 and 62 and pin 73 contacts the upper end of slot 72, thus retracting brushes 15 through guard aperture 68*a* to a protected position to prevent damage to the brushes during movement of a tape in the area "A" (Fig. 4) between the guard and the platen.

For completing any selected circuit due to a brush 15 wiping the fields of platen 19 through a perforation 11 when in operative position, wiper contactors 74 are mounted on an inuslating panel 74*a* secured to an arm 75 of the frame (Fig. 3), to wipe the periphery of the platen 19 when a perforation is present on the tape, and electrically connect the platen to ground or to associated circuits as by wires 74*b*. Since in the present instance there are three isolated channels of conducting material on the platen, each channel 29, 30 and 31 has a set of wiper contactors 74 for the foregoing purpose. The tape 10 may now be stepped by the torque applied by the disc 33 of clutch 32 acting against the driven nylon gear 34. The disc 33 preferably has a polished face abutting the gear 34 so that dirt cannot enter between it and the gear to obstruct or interfere with the precisely required step-by-step feed.

With the solenoid 45 de-energized the spring 43 rocks the escapement to release the holding pawl 41 from a tooth of the ratchet wheel 39, whereupon the biased escapement causes the ratchet wheel 39 to turn the shaft 21 to permit the clutch disc to be turned by the gear 34. Pulsing of the solenoid 45 holds the clapper 41 and likewise the escapement member to stop the ratchet wheel 39 after the desired increment of stepping which in this high speed assembly is one hundredth of a second. Thus, with solenoid 45 pulsed by a rapid succession of pulses, the clutch is alternately driving and slipping.

When the reading of the tape is completed it can be replaced by another tape during which time the brushes 15 are held retracted as explained in connection with Figs. 3 and 4.

What is claimed is:

1. In a perforated tape unit, the combination of a platen having an electrically conductive periphery, a shaft mounting said platen for rotary motion, means to maintain said platen at ground potential, a tape having punched perforations at predetermined places, a bank of circuit terminal wiper brushes, means supporting said brushes respectively for registration with said tape between said platen and said brushes, means supporting said brush bank, means mounting said bank for movement between advanced operative and retracted inoperative positions relative to said platen, means for operating said last means, means to limit the movement of said mounting means whereby said brush bank is maintained with said brushes contacting said platen, a guard to protect said brushes, and reciprocal links supporting said guard to follow the movement of said brush bank.

2. A perforated tape unit according to claim 1 and further including means to lock said links and said brush bank with said brushes in contact with said platen.

3. A perforated tape unit according to claim 2 wherein said locking means includes a lost motion connection between said links and said brush bank mounting means.

4. A programming device for use with an electrically insulating tape preperforated in rows and lanes, and having a lane of driving apertures therein, said device comprising a frame having spaced walls, a rotatably mounted electrically insulating cylindrical platen, an electrically conductive surface on the periphery of said platen, peripherally spaced pins projecting from said platen, means for driving said platen intermittently step-by-step, means for grounding said conductive surface of said platen, a row of individual brushes, means carried by said frame for moving said row of brushes into and out of a position permitting contact thereof with said electrically conductive surface whereby when said brushes are out of said position said tape may be placed on said platen with pins of said platen extending through tape apertures for driving engagement therewith, and whereby only certain of said individual brushes are permitted to contact said conductive surface according to the pattern of perforations in said tape when said brush row is in said position, and means for connecting said individual brushes to associated circuit, said means for moving said row of brushes including a member for mounting said brushes in a row, a bracket for carrying said member, said bracket having spaced flanges engaging spaced walls of said frame, means for retaining each of said flanges on its associated wall for slidable movement relative thereto, and means for so moving said flanges thereby to move said row of brushes relative to said platen.

5. A construction according to claim 4 and further including a guard for said row of brushes, said guard extending between said flanges, and means mounting the ends of said guard on said flanges for slidable movement relative thereto whereby said row of brushes when out of said position are withdrawn into said guard and out of the area between said platen and said guard, and when in said position the ends of said row of brushes extend into said area for contact with said tape and said platen.

6. A construction in accordance with claim 5 wherein said flange mounting means and said guard means include a lost motion connection permitting limited relative movement therebetween at the terminations of their movement, whereby when moving into said position both move together until said guard is adjacent said platen wherein means stops the movement of said guard and permits further limited movement of said flanged bracket to move the ends of said brushes into said area for contact with said platen, and whereby reverse movement of said flanges and guard is simultaneous until means stops movement of said guard and permits further limited movement of said flanges to move the ends of said row of brushes out of said area and behind said guard.

7. A programming device for use with an electrically insulating tape preperforated in rows and lanes and having a lane of driving apertures therein, said device comprising, a frame, a shaft journalled in said frame, a platen secured to said shaft for rotation therewith, drive projections peripherally spaced around said shaft and projecting beyond the periphery of said platen for engaging said driving apertures in said tape, an electrically conductive surface on the periphery of said platen, means for driving said shaft with its platen and pins intermittently step-by-step, means for grounding said conductive surface of said platen, a row of individual brushes, means carried by said frame for bodily moving said row of brushes between terminal advanced and retracted operative and inoperative positions respectively, whereby when said brushes are in said advanced operative position only certain of said individual brushes contact said conductive surface according to the pattern of perforations in said tape, and when said brushes are in their retracted inoperative position, clearance is provided between said brushes and said platen permitting the tape to be placed on said platen with certain of said drive projections extending through the tape apertures for driving engagement therewith, and a guard member surrounding said brushes and movable therewith when said brushes are moved between said terminal positions, said guard, when the brushes are in their advanced operative position, serving to maintain the tape on the platen in driving engagement with said drive projections, and means for connecting said individual brushes to associated circuit.

8. A programming device for use with an electrically insulating tape loop preperforated in rows and lanes and having a lane of driving apertures therein at each side edge, said device comprising, a frame having one wall and an arm extending from said wall, said arm having a transversely extending end portion, a shaft having one end journalled in said frame wall and its other end journalled in said end portion of said arm, an electrically insulating cylindrical platen secured to said shaft for rotation therewith, peripherally spaced pins projecting from each end of said platen, a plurality of electrically conductive surfaces arranged along the periphery of said platen, means for driving said shaft and platen intermittently step-by-step, brush means for grounding said conductive surfaces of said platen, a row of individual brushes, means carried by said frame for bodily reciprocating said row of brushes between terminal advanced and retracted operative and inoperative positions respectively, whereby when said brushes are in said advanced operative position only certain of said individual brushes contact said conductive surfaces according to the pattern of perforations in said tape, and when said brushes are in their retracted inoperative position, clearance is provided between said brushes and said platen whereby said tape may be slipped over said platen and said frame arm from the end of said arm, with pins of said platen extending through the tape apertures for driving engagement therewith, and a guard plate having portions surrounding said brushes and movable therewith when said brushes are moved between said terminal positions, said guard, when said brushes are in said advanced operative position, serving to maintain the tape on the platen in driving engagement with said pins, and means for connecting said individual brushes to associated circuit.

References Cited in the file of this patent

UNITED STATES PATENTS

| | | |
|---|---|---|
| 1,050,078 | Ingman | Jan. 7, 1913 |
| 1,214,540 | Greene | Feb. 6, 1917 |
| 2,175,865 | Anderson | Oct. 10, 1939 |
| 2,338,305 | Simmon | Jan. 4, 1944 |
| 2,477,741 | Haberman | Aug. 2, 1949 |
| 2,656,109 | Lindars | Oct. 20, 1953 |